(12) United States Patent
Zhang et al.

(10) Patent No.: US 11,335,228 B1
(45) Date of Patent: May 17, 2022

(54) SCANNING SIGNAL CIRCUIT, DISPLAY PANEL, DISPLAY DEVICE, AND DRIVING METHOD

(71) Applicants: Wuhan Tianma Micro-Electronics Co., Ltd., Wuhan (CN); Wuhan Tianma Microelectronics Co., Ltd. Shanghai Branch, Shanghai (CN)

(72) Inventors: Mengmeng Zhang, Shanghai (CN); Xingyao Zhou, Shanghai (CN)

(73) Assignees: Wuhan Tianma Micro-Electronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 17/366,339

(22) Filed: Jul. 2, 2021

(30) Foreign Application Priority Data

Mar. 8, 2021 (CN) .......................... 202110252198.2

(51) Int. Cl.
*G09G 3/20* (2006.01)

(52) U.S. Cl.
CPC ....... *G09G 3/20* (2013.01); *G09G 2300/0804* (2013.01); *G09G 2300/0809* (2013.01); *G09G 2310/0267* (2013.01); *G09G 2310/08* (2013.01); *G09G 2330/04* (2013.01)

(58) Field of Classification Search
None
See application file for complete search history.

(56) References Cited

U.S. PATENT DOCUMENTS

| 10,490,150 | B2 * | 11/2019 | Ma | ............................ G09G 3/20 |
| 2013/0027377 | A1 * | 1/2013 | Yang | ..................... G09G 3/3677 |
| | | | | 345/212 |
| 2021/0225253 | A1 * | 7/2021 | Li | .......................... G11C 19/28 |

FOREIGN PATENT DOCUMENTS

| CN | 109308864 A | 2/2019 |
| CN | 109545151 A | 3/2019 |

* cited by examiner

*Primary Examiner* — Christopher J Kohlman
(74) *Attorney, Agent, or Firm* — Anova Law Group, PLLC

(57) ABSTRACT

A scanning signal circuit, a display panel and a driving method are provided. In the scanning signal circuit, under an action of an input signal, a first target clock signal, a second target clock signal and a third target clock signal, the input signal and the second target clock signal are transmitted to a potential stabilization module, a first output module and a second output module through an input module and a potential control module; and under a stabilization function of the potential stabilization module that is applied on inputs of the first and second output modules through a high-level signal and a third target clock signal, the first output module is configured to output a first output signal, and the second output module is configured to use a fourth target clock signal to output a second output signal with high-level pulses.

19 Claims, 8 Drawing Sheets

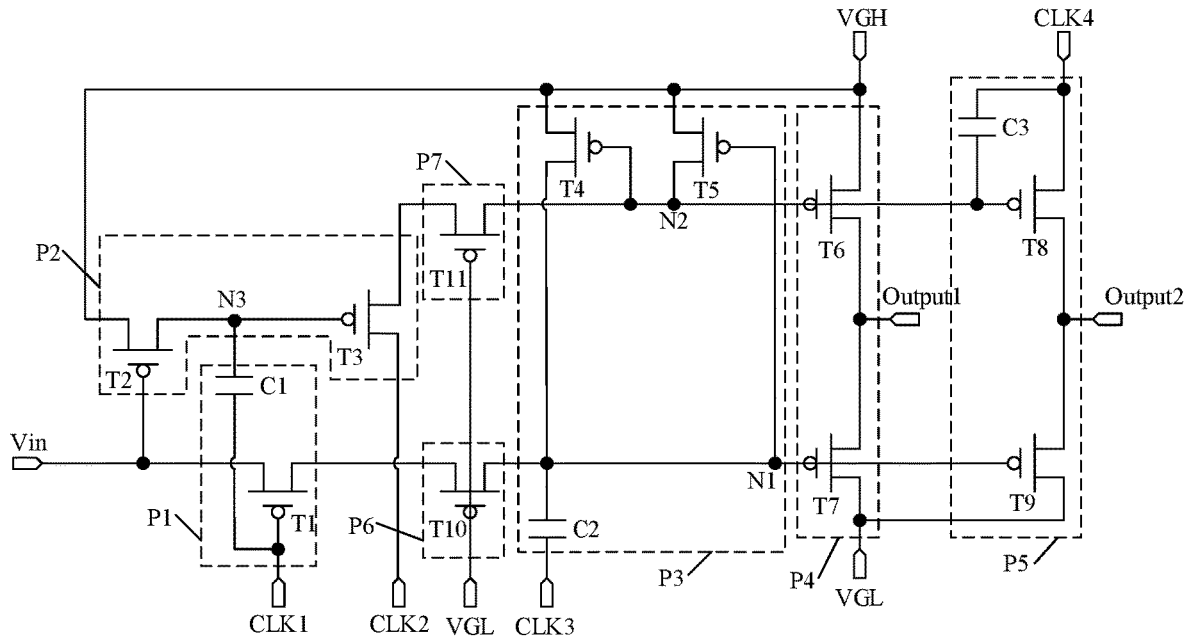

FIG. 5

```
┌─────────────────────────────────────┐
│  Under an action of the input signal, the first target │
│  clock signal, the second target clock signal, and the │
│  third target clock signal, transmitting the input signal │──S601
│  and the second target clock signal to the potential │
│  stabilization module, the first output module and the │
│  second output module through the input module and │
│  the potential control module │
└─────────────────────────────────────┘
              │
              ▼
┌─────────────────────────────────────┐
│  Stabilizing an input of the first output module and an │
│  input of the second output module by the potential │──S602
│  stabilization module using the high-level signal and │
│  the third target clock signal │
└─────────────────────────────────────┘
         │              │
         ▼              ▼
┌──────────────────┐  ┌──────────────────────────┐
│ Outputting a first│  │ Outputting a second output signal with │
│ output signal using│──S603 │ high-level pulses by the second output │──S604
│ the first output │  │ module using the fourth target clock │
│ module │  │ signal │
└──────────────────┘  └──────────────────────────┘
```

FIG. 6

SCANNING SIGNAL CIRCUIT, DISPLAY PANEL, DISPLAY DEVICE, AND DRIVING METHOD

CROSS-REFERENCE TO RELATED APPLICATION

This application claims the priority of Chinese Patent Application No. 202110252198.2, filed on Mar. 8, 2021, the content of which is incorporated by reference in its entirety.

TECHNICAL FIELD

The present disclosure generally relates to the field of display technology and, more particularly, relates to a scanning signal circuit, a display panel, a display device, and a driving method.

BACKGROUND

With the popularization of display panels, the requirements for the performances of the display panels are getting higher and higher. The high-performance requirements of the display panels promote the rapid developments of various technologies of display panels.

Due to the advantages of the low temperature polycrystalline oxide (LTPO) technology, such as high charge mobility, high pixel response speed, and low power consumption, the LTPO technology is increasingly used in display panels. The pixel driving circuit in the display panel using the LTPO technology needs a scanning signal with high-level pulses. However, at the current stage, the scanning signal circuit that provides the scanning signal for the pixel driving circuit can only output a scanning signal with low-level pulses and cannot provide a scanning signal with high-level pulses.

SUMMARY

One aspect of the present disclosure provides a scanning signal circuit. The scanning signal circuit may include an input module, a potential control module, a potential stabilization module, a first output module and a second output module. The input module is configured to receive an input signal and a first target clock signal, and electrically connected to the potential control module, the potential stabilization module, the first output module, and the second output module; the potential control module is configured to receive a high-level signal and a second target clock signal, and is electrically connected to the potential stabilization module, the first output module, and the second output module; the potential stabilization module is configured to receive the high-level signal and a third target clock signal, and is electrically connected to the first output module and the second output module; the first output module is configured to receive the high-level signal and a low-level signal; the second output module is configured to receive a fourth target clock signal and the low-level signal and the fourth target clock signal is a signal with high-level pulses. Under an action of the input signal, the first target clock signal, the second target clock signal and the third target clock signal, the input signal and the second target clock signal are transmitted to the potential stabilization module, the first output module and the second output module through the input module and the potential control module; under a stabilization function of the potential stabilization module on an input of the first output module and an input of the second output module using the high-level signal and the third target clock signal, the first output module is configured to output a first output signal, and the second output module is configured to use the fourth target clock signal to output a second output signal with high-level pulses; the first output signal is used as an input signal of a next-stage scanning signal circuit; and the second output signal is used as a scanning signal of a pixel driving circuit.

Another aspect of the present disclosure provides a display panel. The display panel may include a display area, and a non-display area. The display area may include multiple rows of pixel driving circuits; the multiple rows of pixel driving circuits include N-type transistors; and the non-display area includes a scanning signal circuit disposed corresponding to each row of pixel driving circuits of the multiple rows of pixel driving circuits. The scanning signal circuit may include an input module, a potential control module, a potential stabilization module, a first output module and a second output module. The input module is configured to receive an input signal and a first target clock signal, and is electrically connected to the potential control module, the potential stabilization module, the first output module, and the second output module; the potential control module is configured to receive a high-level signal and a second target clock signal, and is electrically connected to the potential stabilization module, the first output module, and the second output module; the potential stabilization module is configured to receive the high-level signal and a third target clock signal, and is electrically connected to the first output module and the second output module; the first output module is configured to receive the high-level signal and a low-level signal; the second output module is configured to receive a fourth target clock signal and the low-level signal; the fourth target clock signal is a signal with high-level pulses; under an action of the input signal, the first target clock signal, the second target clock signal, and the third target clock signal, the input signal and the second target clock signal are transmitted to the potential stabilization module, the first output module and the second output module through the input module and the potential control module; under a stabilization function of the potential stabilization module on an input of the first output module and an input of the second output module using the high-level signal and the third target clock signal, the first output module is configured to output a first output signal, and the second output module is configured to use the fourth target clock signal output to output a second output signal with high-level pulses; the first output signal is used as an input signal of a next-stage scanning signal circuit; and the second output signal is used as a scanning signal of a pixel driving circuit. An i-th row of pixel driving circuits of the multiple rows of pixel driving circuits is electrically connected to an output terminal of the second output module of the scanning signal circuit corresponding to the i-th row of pixel driving circuits. i is a positive integer. An output terminal of the first output module of the scanning signal circuit corresponding to the i-th row of pixel driving circuits of the multiple rows of pixel driving circuits is electrically connected with an input terminal of the input module of the scanning signal circuit corresponding to an (i+1)-th row of pixel driving circuits of the multiple rows of pixel driving circuits.

Another aspect of the present disclosure provides a display device. The display device may include a display panel. The display panel may include a display area, and a non-display area. The display area may include multiple rows of pixel driving circuits; the multiple rows of pixel driving circuits include N-type transistors; and the non-display area includes a scanning signal circuit disposed corresponding to each row of pixel driving circuits of the multiple rows of pixel driving circuits. The scanning signal circuit may include an input module, a potential control module, a potential stabilization module, a first output module and a second output module. The input module is configured to receive an input signal and a first target clock signal, and is electrically connected to the potential control module, the potential stabilization module, the first output module, and the second output module; the potential control module is configured to receive a high-level signal and a second target clock signal, and is electrically connected to the potential stabilization module, the first output module, and the second output module; the potential stabilization module is configured to receive the high-level signal and a third target clock signal, and is electrically connected to the first output module and the second output module; the first output module is configured to receive the high-level signal and a low-level signal; the second output module is configured to receive a fourth target clock signal and the low-level signal; the fourth target clock signal is a signal with high-level pulses; under an action of the input signal, the first target clock signal, the second target clock signal, and the third target clock signal, the input signal and the second target clock signal are transmitted to the potential stabilization module, the first output module and the second output module through the input module and the potential control module; under a stabilization function of the potential stabilization module on an input of the first output module and an input of the second output module using the high-level signal and the third target clock signal, the first output module is configured to output a first output signal, and the second output module is configured to use the fourth target clock signal output to output a second output signal with high-level pulses; the first output signal is used as an input signal of a next-stage scanning signal circuit; and the second output signal is used as a scanning signal of a pixel driving circuit. An i-th row of pixel driving circuits of the multiple rows of pixel driving circuits is electrically connected to an output terminal of the second output module of the scanning signal circuit corresponding to the i-th row of pixel driving circuits. i is a positive integer. An output terminal of the first output module of the scanning signal circuit corresponding to the i-th row of pixel driving circuits of the multiple rows of pixel driving circuits is electrically connected with an input terminal of the input module of the scanning signal circuit corresponding to an (i+1)-th row of pixel driving circuits of the multiple rows of pixel driving circuits.

Another aspect of the present disclosure provides a method for driving a scanning signal circuit. The method may include providing a scanning signal circuit including an input module, a potential control module, a potential stabilization module, a first output module and a second output module. The input module is configured to receive an input signal and a first target clock signal, and is electrically connected to the potential control module, the potential stabilization module, the first output module, and the second output module; the potential control module is configured to receive a high-level signal and a second target clock signal, and is electrically connected to the potential stabilization module, the first output module, and the second output module; the potential stabilization module is configured to receive the high-level signal and a third target clock signal, and is electrically connected to the first output module and the second output module; the first output module is configured to receive the high-level signal and the low-level signal; the second output module is configured to receive a fourth target clock signal and the low-level signal; and the fourth target clock signal is a signal with high-level pulses. The method may also include, under an action of the input signal, the first target clock signal, the second target clock signal, and the third target clock signal, transmitting the input signal and the second target clock signal to the potential stabilization module, the first output module and the second output module through the input module and the potential control module; stabilizing an input of the first output module and an input of the second output module by the potential stabilization module using the high-level signal and the third target clock signal; outputting a first output signal using the first output module, and outputting a second output signal with high-level pulses by the second output module using the fourth target clock signal. The first output signal is used as an input signal of a next-stage scanning signal circuit; and the second output signal is used as a scanning signal of a pixel driving circuit.

Other aspects of the present disclosure can be understood by those skilled in the art in light of the description, the claims, and the drawings of the present disclosure.

BRIEF DESCRIPTION OF THE DRAWINGS

The present disclosure may be better understood from the following description of specific implementations of the disclosure in conjunction with the accompanying drawings. The same or similar reference signs indicate the same or similar features.

FIG. 5 illustrates an exemplary structure of the scanning signal circuit in FIG. 4;

FIG. 6 illustrates a flow chart of an exemplary driving method of a scanning signal circuit according to an embodiment of the present disclosure;

DETAILED DESCRIPTION

Figure 1:
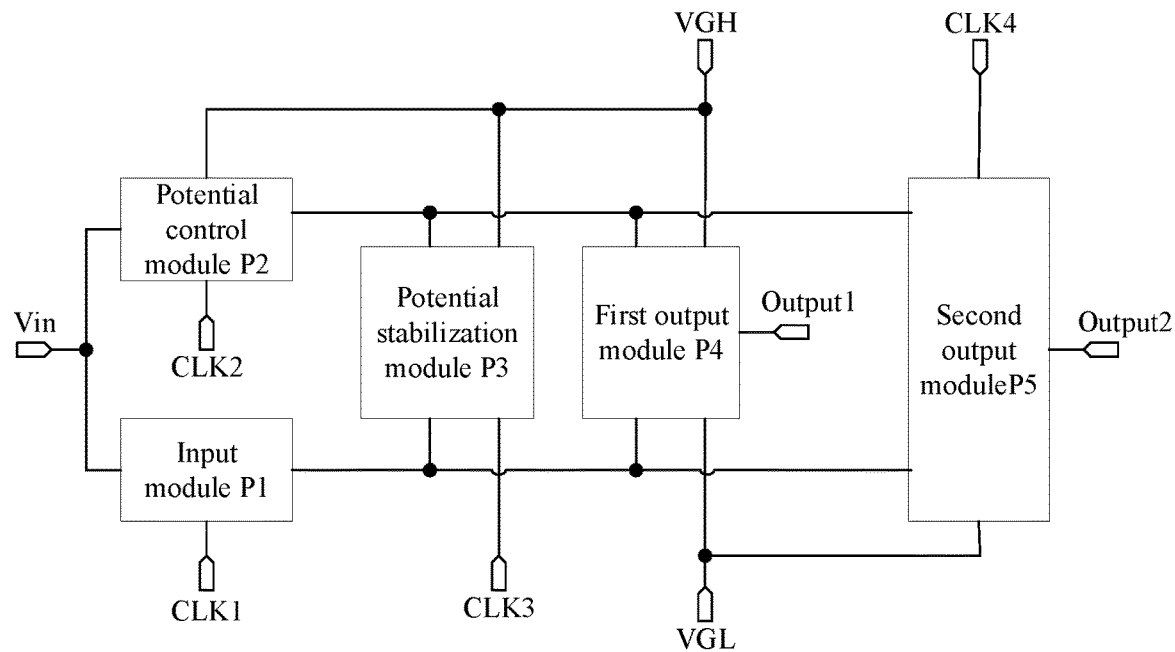
FIG. 1 illustrates an exemplary scanning signal according to an embodiment of the present disclosure.

The features and exemplary embodiments of various aspects of the present disclosure will be described in detail below. In the following detailed description, many specific details are proposed to provide a comprehensive understanding of this disclosure. However, it is obvious to those skilled in the art that this disclosure can be implemented without some of these specific details. The following description of the embodiments is only to provide a better understanding of the present disclosure by showing examples of the present disclosure. This disclosure is by no means limited to any specific configurations and algorithms proposed below, but covers any modification, replacement and improvement of elements, components, and algorithms without departing from the spirit of this disclosure. In the drawings and the following description, well-known structures and technologies are not shown to avoid unnecessary obscurity of the disclosure. It is obvious to those skilled in the art that various modifications and changes can be made in this disclosure without departing from the spirit or scope of this disclosure. Therefore, this disclosure intends to cover the amendments and changes of this disclosure that fall within the scope of the corresponding claims (claimed technical solutions) and their equivalents. It should be noted that the implementation manners provided in the embodiments of the present disclosure can be combined with each other if there is no contradiction.

With the popularization of display panels, the requirements for the performances of the display panels are getting higher and higher. Due to the advantages of the low temperature polycrystalline oxide (LTPO) technology, such as high charge mobility, high pixel response speed, and low power consumption, the LTPO technology is also increasingly used in display panels. The display panel manufactured by the LTPO technology has N-type transistors, and the scanning signal that controls the conduction of the N-type transistor is a signal with high-level pulses. Therefore, there is an urgent need for a scanning signal circuit capable of generating a scanning signal with high-level pulses.

The present disclosure provides a scanning signal circuit, a display panel, a display device, and a driving method. The scanning signal circuit may be able to generate a signal with high-level pulses to meet the needs of the display panel and the display device, etc.

FIG. 1 is a schematic structural diagram of an exemplary scanning signal circuit consistent with various disclosed embodiments of the present disclosure. As shown in FIG. 1, the scanning signal circuit may include an input module P1, a potential control module P2, a potential stabilization module P3, a first output module P4, and a second output module P5.

The input module P1 may be configured to receive an input signal and a first target clock signal, and may be electrically connected to the potential control module P2, the potential stabilization module P3, the first output module P4, and the second output module P5. The potential control module P2 may be configured to receive a high-level signal and a second target clock signal, and may be electrically connected to the potential stabilization module P3, the first output module P4, and the second output module P5. The potential stabilization module P3 may be configured to receive a high-level signal and a third target clock signal, and may be electrically connected to the first output module P4 and the second output module P5. The first output module P4 may be configured to receive a high-level signal and a low-level signal. The second output module P5 may be configured to receive a fourth target clock signal and a low-level signal.

The input signal may be provided by the input signal terminal Vin. The high-level signal may be provided by the high-level signal terminal VGH. The low-level signal may be provided by the low-level signal terminal VGL. The voltage of the high-level signal may be higher than the voltage of the low-level signal, and the voltage of the high-level signal and the voltage of the low-level signal may be set according to the work scenario and work requirements, which is not limited here.

The first target clock signal, the second target clock signal, the third target clock signal, and the fourth target clock signal may be provided by different clock signal terminals. For ease of description, as shown in FIG. 1, the configuration that the first target clock signal may be provided by the first clock signal terminal CLK1, the second target clock signal may be provided by the second clock signal terminal CLK2, and the third target clock signal may be provided by the third clock signal terminal CLK3, and the fourth target clock signal may be provided by the fourth clock signal terminal CLK4 is used as an example. The first target clock signal, the second target clock signal, the third target clock signal, and the fourth target clock signal may be periodic clock signals. Among them, the fourth target clock signal may be a signal with high-level pulses.

For ease of understanding, as shown in FIG. 1, the output terminal of the first output module P4 may be marked as Output1, and the output terminal Output1 may output the first output signal. The output terminal of the second output module P5 may be marked as Output2, and the output terminal Output2 may output the second output signal.

Under the action of the input signal, the first target clock signal, the second target clock signal and the third target clock signal, the input signal and the second target clock signal may be transmitted to the potential stabilization module P3, the first output module P4 and the second output module P5 through the input module P1 and the potential control module P2. When the potential stabilization module P3 uses the high-level signal and the third target clock signal to stabilize the input of the first output module P4 and the input of the second output module P5, the first output module P4 may be made to output the first output signal such that the second output module P5 may use the fourth target clock signal to output a second output signal with high-level pulses. The first output signal may be used as the input signal of the next-stage scanning signal circuit. In some embodiments, the display panel may include pixel drive circuits arranged in rows and columns, and each row of pixel drive circuits may be provided with one scan signal circuit in the embodiment of the present disclosure. The scanning signal circuit corresponding to a next row of pixel driving circuits of one row of pixel driving circuits may the next stage scanning signal circuit of the scanning signal circuit corresponding to one row of pixel driving circuits. The second output signal may be used as a scanning signal of the pixel driving circuit.

For example, the input module P1 may transmit the input signal to the potential stabilization module P3, the first output module P4, and the second output module P5 under the action of the first target clock signal. The potential control module P2 may transmit the second target clock signal to the potential stabilization module P3, the first output module P4, and the second output module P5 under the control of the input module P1. Under the effect of the transmitted input signal and the second target clock signal, the potential stabilization module P3 may use the high-level signal and the third target clock signal to stabilize the input of the first output module P4 and the input of the second output module P5. Under the action of the high-level signal, the third target clock signal, the transmitted input signal, the transmitted second target clock signal and the fourth target clock signal, the first output signal output by the first output module P4 may be controlled by controlling the input of the first output module P4; and second output signal output by the second output module P5 may be controlled by controlling the input of the second output module P5.

The input module P1, the potential control module P2, the potential stabilization module P3, the first output module P4, and the second output module P5 may include, but are not limited to, transistors, capacitors, and other devices. The input signal, the first target clock signal, the second target clock signal, the third target clock signal, and the fourth target clock signal may cooperate with the scanning signal circuit in the embodiment of the present disclosure to realize the on/off of transistors in the potential the input module P1, the potential control module P2, the stabilization module P3, the first output module P4, and the second output module P5. Accordingly, the output of the first output module P4 may be used as the input signal of the next-stage scanning signal circuit, and the output of the second output module P5 may be used as the second output signal of the scanning signal of the pixel driving circuit.

In one embodiment of the present disclosure, under the action of the input signal, the first target clock signal, the second target clock signal and the third target clock signal, the input module P1 and the potential control module P2 in the scanning signal circuit may transmit the input signal and the second target clock signal to the potential stabilization module P3, the first output module P4, and the second output module P5. The first output module P4 may output the first output signal that may be used as the input signal of the next-stage scanning signal circuit under the stabilization effect of the potential stabilization module P3 and the action of the high-level signal and the low-level signal. The second output module P5 may output the second output signal with the high-level pulses as the scanning signal of the pixel driving circuit under the stabilization action of the potential stabilization module P3 and the action of the fourth target clock signal and the low-level signal. Accordingly, the scanning signal with high-level pulses may be provided.

Figure 2:
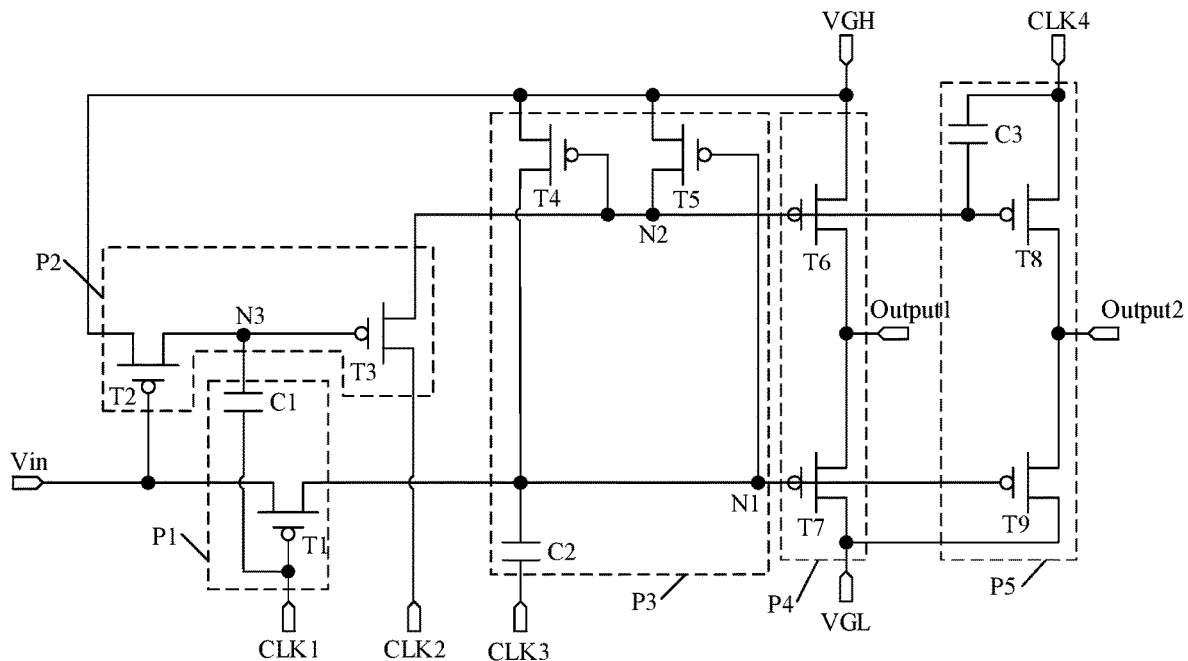
FIG. 2 illustrates an exemplary structure of the scanning signal circuit in FIG. 1.

The specific structure of each module in the scanning signal circuit will be described below with an example. FIG. 2 is a schematic diagram of a specific structure of the scanning signal circuit shown in FIG. 1.

As shown in FIG. 2, the input module P1 may include a first transistor T1 and a first capacitor C1. The potential control module P2 may include a second transistor T2 and a third transistor T3. The potential stabilization module P3 may include a fourth transistor T4, a fifth transistor T5, and a second capacitor C2. The first output module P4 may include a sixth transistor T6 and a seventh transistor T7. The second output module P5 may include an eighth transistor T8, a ninth transistor T9, and a third capacitor C3.

The control terminal of the first transistor T1 may be configured to receive the first target clock signal, and may be electrically connected to the first terminal of the first capacitor C1. The first terminal of the first transistor T1 may be configured to receive an input signal and may be electrically connected to the potential control module P2. The second terminal of the first transistor T1 may be electrically connected to the potential stabilization module P3, the first output module P4, and the second output module P5. For example, the control terminal of the first transistor T1 may be electrically connected to the first clock signal terminal CLK1. The first terminal of the first transistor T1 may be electrically connected to the control terminal of the second transistor T2 in the potential control module P2. The second terminal of the first transistor T1 may be electrically connected to the first terminal of the second capacitor C2 in the potential stabilization module P3, the first terminal of the fourth transistor T4, the control terminal of the fifth transistor T5, the control terminal of the seventh transistor T7 in the first output module P4, and the control terminal of the eighth transistor T8 in the second output module P5.

The first terminal of the first capacitor C1 may be configured to receive the first target clock signal. The second terminal of the first capacitor C1 may be electrically connected to the potential control module P2. For example, the first terminal of the first capacitor C1 may be electrically connected to the first clock signal terminal CLK1. The second terminal of the first capacitor C1 may be electrically connected to the second terminal of the second transistor T2 and the control terminal of the third transistor T3 in the potential control module P2.

The control terminal of the second transistor T2 may be configured to receive the input signal, and may be electrically connected to the input module P1. The first terminal of the second transistor T2 may be configured to receive a high-level signal, and may be electrically connected to the potential stabilization module P3 and the first output module P4. The second terminal of the second transistor T2 may be electrically connected to the input module P1 and the control terminal of the third transistor T3. For example, the control terminal of the second transistor T2 may be electrically connected to the input signal terminal Vin. The first terminal of the second transistor T2 may be electrically connected to the high-level signal terminal VGH, the second terminal of the fourth transistor T4 in the potential stabilization module P3, the second terminal of the fifth transistor T5, and the first terminal of the sixth transistor T6 in the first output module P4.

The control terminal of the third transistor T3 may be electrically connected to the input module P1. The first terminal of the third transistor T3 may be electrically connected to the potential stabilization module P3, the first output module P4, and the second output module P5. The second terminal of the third transistor T3 may be configured to receive the second target clock signal. For example, the first terminal of the third transistor T3 may be electrically connected to the control terminal of the fourth transistor T4 in the potential stabilization module P3, the first terminal of the fifth transistor T5, the control terminal of the sixth transistor T6 in the first output module P4, the control terminal of the eighth transistor T8 in the second output module P5 and the first terminal of the third capacitor C3. The second terminal of the third transistor T3 may be electrically connected to the second clock signal terminal CLK2.

The control terminal of the fourth transistor T4 may be electrically connected to the first terminal of the potential control module P2, the first output module P4, the second output module P5, and the first terminal of the fifth transistor T5. The first terminal of the fourth transistor T4 may be electrically connected to the first terminal of the second capacitor C2, the control terminal of the fifth transistor T5, the input module P1, the first output module P4 and the second output module P5. The second terminal of the fourth transistor T4 may be configured to receive a high-level signal, and may be electrically connected to the potential control module P2 and the second terminal of the fifth transistor T5, and may also be electrically connected to the first output module P4. For example, the control terminal of the fourth transistor T4 may be electrically connected to the control terminal of the sixth transistor T6 in the first output module P4, the control terminal of the eighth transistor T8 in the second output module P5, and the first terminal of the third capacitor C3. The first terminal of the fourth transistor T4 may be electrically connected to the control terminal of the seventh transistor T7 in the first output module P4 and the control terminal of the ninth transistor T9 in the second output module P5. The second terminal of the fourth transistor T4 may be electrically connected to the high-level signal terminal VGH and the first terminal of the sixth transistor T6 in the first output module P4.

The control terminal of the fifth transistor T5 may be electrically connected to the first terminal of the second capacitor C2, the input module P1, the first output module P4, and the second output module P5. The first terminal of the fifth transistor T5 may be electrically connected to the potential control module P2, the first output module P4, and the second output module P5. The second terminal of the fifth transistor T5 may be configured to receive a high-level signal, and may be electrically connected to the potential control module P2, and may be electrically connected to the first output module P4. For example, the control terminal of the fifth transistor T5 may be electrically connected to the control terminal of the seventh transistor T7 in the first output module P4 and the control terminal of the ninth transistor T9 in the second output module P5. The first terminal of the fifth transistor T5 may be electrically connected to the control terminal of the sixth transistor T6 in the first output module P4, the control terminal of the eighth transistor T8 in the second output module P5, and the first terminal of the third capacitor C3. The second terminal of the fifth transistor T5 may be electrically connected to the high-level signal terminal VGH and the first terminal of the sixth transistor T6 in the first output module P4.

The second terminal of the second capacitor C2 may be configured to receive the third target clock signal. For example, the second terminal of the second capacitor C2 may be electrically connected to the third clock signal terminal CLK3.

The control terminal of the sixth transistor T6 may be electrically connected to the potential stabilization module P3 and the potential control module P2. The first terminal of the sixth transistor T6 may be configured to receive a high-level signal, and may be electrically connected to the potential stabilization module P3 and the potential control module P2. The second terminal of the sixth transistor T6 may be electrically connected to the first terminal of the seventh transistor T7 and the output terminal of the first output module P4. For example, the control terminal of the sixth transistor T6 may be electrically connected to the control terminal of the eighth transistor T8 in the second output module P5 and the first terminal of the third capacitor C3. The first terminal of the sixth transistor T6 may be electrically connected to the high-level signal terminal VGH. The second terminal of the sixth transistor T6 may be electrically connected to the output terminal Output1.

The control terminal of the seventh transistor T7 may be electrically connected to the potential stabilization module P3 and the input module P1. The first terminal of the seventh transistor T7 may be electrically connected to the output terminal of the first output module P4. The second terminal of the seventh transistor T7 may be configured to receive a low-level signal. For example, the first terminal of the seventh transistor T7 may be electrically connected to the output terminal Output1. The second terminal of the seventh transistor T7 may be electrically connected to the low-level signal terminal VGL and the second terminal of the ninth transistor T9 in the second output module P5.

The control terminal of the eighth transistor T8 may be electrically connected to the first terminal of the third capacitor C3, the potential control module P2, and the potential stabilization module P3, and may also be electrically connected to the first output module P4. The first terminal of the eighth transistor T8 may be configured to receive the fourth target clock signal, and may be electrically connected to the second terminal of the third capacitor C3. The second terminal of the eighth transistor T8 may be electrically connected to the first terminal of the ninth transistor T9 and the output terminal of the second output module P5. For example, the first terminal of the eighth transistor T8 may be electrically connected to the fourth clock signal terminal CLK4. The second terminal of the eighth transistor T8 may be electrically connected to the output terminal Output2.

The control terminal of the ninth transistor T9 may be electrically connected to the input module P1 and the potential stabilization module P3, and may also be electrically connected to the first output module P4. The first terminal of the ninth transistor T9 may be electrically connected to the output terminal of the second output module P5. The second terminal of the ninth transistor T9 may be configured to receive a low-level signal. The first terminal of the ninth transistor T9 may be electrically connected to the output terminal Output2. The second terminal of the ninth transistor T9 may be electrically connected to the low-level signal terminal VGL.

The second terminal of the third capacitor C3 may be configured to receive the fourth target clock signal. For example, the second terminal of the third capacitor C3 may be electrically connected to the fourth clock signal terminal CLK4.

Figure 3:
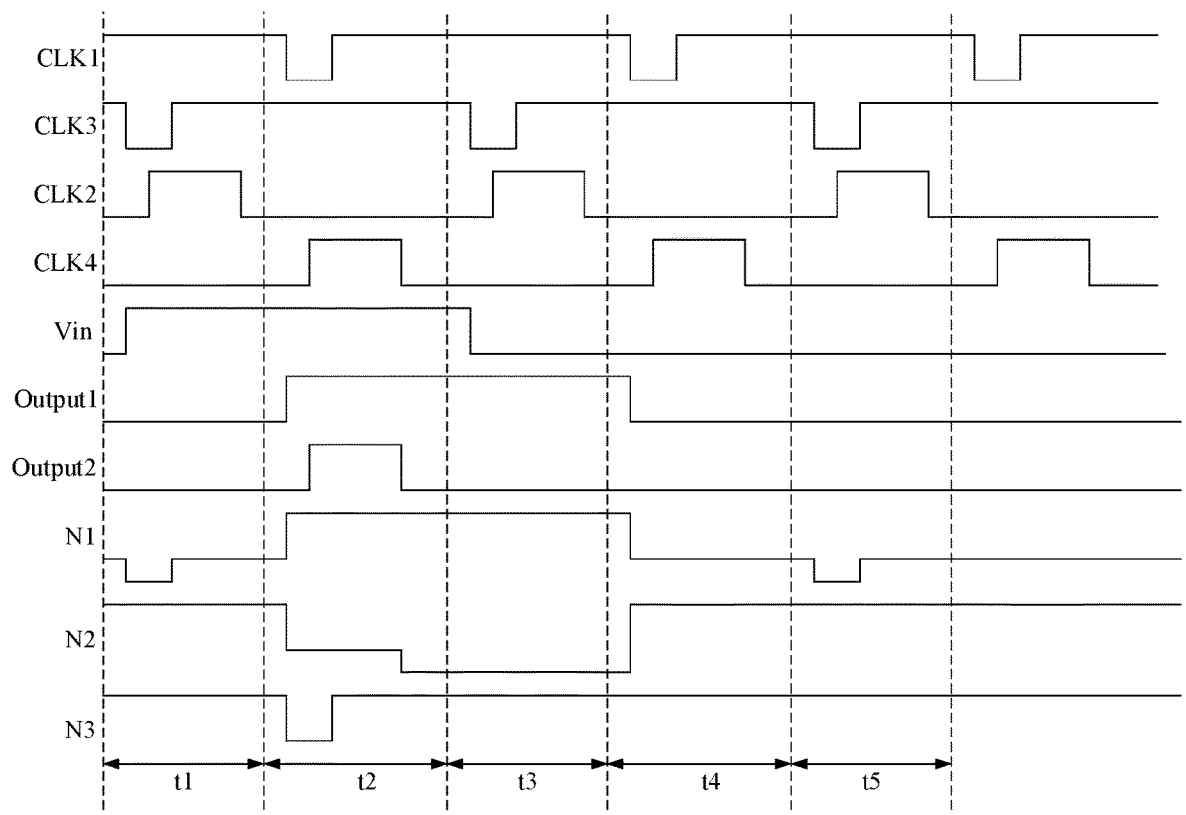
FIG. 3 illustrates a sequence diagram of signal for driving an exemplary scanning signal circuit according to an embodiment of the present disclosure.

The working principle of the scanning signal circuit shown in FIG. 2 will be described below through the time sequence relationship of each signal. FIG. 3 is a sequence diagram of signals for driving a scanning signal circuit consistent with various disclosed embodiments of the present disclosure. FIG. 3 shows the signal sequence at nodes N1, N2, and N3 in the scanning signal circuit shown in FIG. 2 and the first clock signal terminal CLK1, the second clock signal terminal CLK2, the third clock signal terminal CLK3, and the fourth clock signal terminal CLK4. Output1 and Output2 in FIG. 3 may be the signal sequence of the first output signal and the second output signal, respectively. The signal sequence shown in FIG. 3 is a portion of a periodical signal sequence.

As shown in FIG. 3, in the t1 stage, the first target clock signal may be a high-level signal, the node N3 may correspond to a high-level, and both the first transistor T1 and the third transistor T3 may be turned off for disconnections. The input signal may be a high-level signal, and the second transistor T2 may be turned off for a disconnection. When the third target clock signal is at a low-level, the node N1 may correspond to a low-level, and the fifth transistor T5, the seventh transistor T7, and the ninth transistor T9 may be all turned on for conductions. The fifth transistor T5 may transmit the high-level signal of the high-level signal terminal VGH to the node N2 corresponding to the high-level. The sixth transistor T6 and the eighth transistor T8 may all be turned off under the action of the high level at the node N2 for the disconnections. The seventh transistor T7 and the ninth transistor T9 may respectively transmit the low-level signal of the low-level signal terminal VGL to the output terminal of the first output module P4 and the output terminal of the second output module P5. At this time, the first output signal and the second output signal may be both at a low-level. When the third target clock signal is at a high-level and does not jump, the node N1 may maintain the low-level of the previous stage.

In the t2 stage, the input signal may be a high-level signal, and the second transistor T2 may be turned off for a disconnection. When the first target clock signal is at a low-level, both the first transistor T1 and the third transistor T3 may be turned on for conductions. The signal at the node N3 may be consistent with the first target clock signal. For example, when the first target clock signal is at a low-level, the node N3 may correspond to a low-level. When the first target clock signal is at a high-level, the node N3 may correspond to a high-level. The input signal may be transmitted to the node N1 through the first transistor T1, and the node N1 may correspond to the high-level, and the fifth transistor T5, the seventh transistor T7, and the ninth transistor T9 may be all turned off for disconnections. The second target clock signal may be transmitted to the node N2 through the third transistor T3. The node N2 may correspond to a low-level signal, and both the sixth transistor T6 and the eighth transistor T8 may be turned on for the conductions. At this time, the first output signal may be at a high-level, and the second output signal may be same as the fourth target clock signal. For example, when the fourth target clock signal is at the high-level, the second output signal may also be at a high-level; and when the fourth target clock signal is at a low-level, the second output signal may also be at a low-level. When the fourth target signal changes from the high-level to a low-level, the fourth target clock signal may further lower the voltage at the node N2.

In the t3 stage, the input signal may be at a low-level, and the second transistor T2 may be turned on for a conduction. The high-level signal of the high-level signal terminal VGH may be transmitted to the node N3 through the second transistor T2, and the node N3 may correspond to the high-level. The first target clock signal may be at a high-level, and both the first transistor T1 and the third transistor T3 may be turned off for a disconnection. The node N2 may maintain the signals of the t2 stage. For example, the node N2 may correspond to a low-level, and the fourth transistor T4, the sixth transistor T6, and the eighth transistor T8 may be turned on for conductions. The high-level signal of the high-level signal terminal VGH may be transmitted to the node N1 through the fourth transistor T4 to stabilize the voltage at the node N1 to cause the node N1 to correspond to a high-level. The fifth transistor T5, the seventh transistor T7, and the ninth transistor T9 may all be turned off. The high-level signal of the high-level signal terminal VGH may be transmitted to the output terminal of the first output module P4 through the sixth transistor T6. For example, the first output signal may be at the high-level at this time. The fourth target clock signal may be transmitted to the output terminal of the second output module P5 through the eighth transistor T8. For example, the second output signal may be at a low level at this time.

At the stage t4, the input signal may be is at a low-level, the second transistor T2 may be turned on for a conduction, and the node N3 may be at a high-level correspondingly. When the first target clock signal is at a low-level, the first transistor T1 may be turned on for a conduction. The input signal may be transmitted to the first node N1 through the first transistor T1, and the node N1 may correspond to a low-level, and the fifth transistor T5, the seventh transistor T7, and the ninth transistor T9 may all be turned on for conductions. The high-level signal of the high-level signal terminal VGH may be transmitted to the node N2 through the fifth transistor T5, which may correspond to the high-level, and the fourth transistor T4 and the sixth transistor T6 may be both turned off for disconnections. The low-level signal of the low-level signal terminal VGL may be transmitted to the output terminal of the first output module P4 through the seventh transistor T7. For example, the first output signal may be at the low-level at this time. The fourth target clock signal may be at the low-level, the eighth transistor T8 may be turned on for a conduction, and the fourth target clock signal may pass through the eighth transistor T8 and the output terminal of the second output module P5. For example, the second output signal may be at a low-level at this time. When the first target clock signal is at a high-level and the third target clock signal is at a high-level without a jump, the node N1 may correspondingly maintain the voltage of the previous stage and may be still at a low-level.

In the t5 stage, the first target clock signal may be at a high-level, and the first transistor T1 and the third transistor T3 may be turned off for disconnections. The input signal may be a low-level signal, and the second transistor T2 may be turned on for a conduction. The high-level signal of the high-level signal terminal VGH may be transmitted to the node N3 through the second transistor T2, and the node N3 may correspond to the high-level. When the third target clock signal is at a low-level, the third target clock signal may be coupled through the second capacitor C2 to pull down the voltage at the node N1. The node N1 may be at a low-level, and the fifth transistor T5, the seventh transistor T7, and the ninth transistor T9 may all be turned on for conductions. The low-level signal of the low-level signal terminal VGL may be respectively transmitted to the output terminal of the first output module P4 and the output terminal of the second output module P5 through the seventh transistor T7 and the ninth transistor T9. For example, the first output signal may be at the low-level, and the second output signal may be at the low-level.

In the above stage, the fourth transistor T4 and the fifth transistor T5 in the potential stabilization module P3 may interact with each other such that the high/low-level of the voltage at the node N1 may be opposite to the high/low levels of the voltage the node N2 to stabilize the voltage at the node N1 and the voltage at the node N2. For example, the inputs of the first output module P4 and the second output module P5 may be stabilized.

The first target clock signal and the third target clock signal in the foregoing embodiment may both be signals with low-level pulses. There is a shift in the time sequence between the low-level pulses in the first target clock signal and the low-level pulses in the third target clock signal. For example, the first target clock signal and the third target clock signal may not be at the low-level at the same time.

The second target clock signal in the above embodiment may be a signal with high-level pulses. There may be a shift in the time sequence between the high-level pulses in the second target clock signal and the high-level pulses in the fourth target clock signal. For example, the second target clock signal and the fourth target clock signal may not be at the high-level at the same time.

Through the coordination of the first target clock signal, the second target clock signal, the third target clock signal, and the fourth target clock signal, the first output signal output by the first output module P4 may be the input signal shifted in time sequence. The second output signal output by the second output module P5 may be a signal with high-level pulses.

Because the input of the first output module P4 and the input of the second output module P5 may have a signal whose voltage is lower than the voltage of the low-level signal, the signal whose voltage is lower than the voltage of the low-level signal may be transmitted to the input module P1, the bias state of the device in the input module P1 and/or the potential control module P2 may be adversely affected. Accordingly, the stability of the entire scanning signal circuit may be reduced. To improve the stability of the scanning signal circuit, the present disclosure may provide a protection module to protect the input module P1 and/or the potential control module P2.

Figure 4:
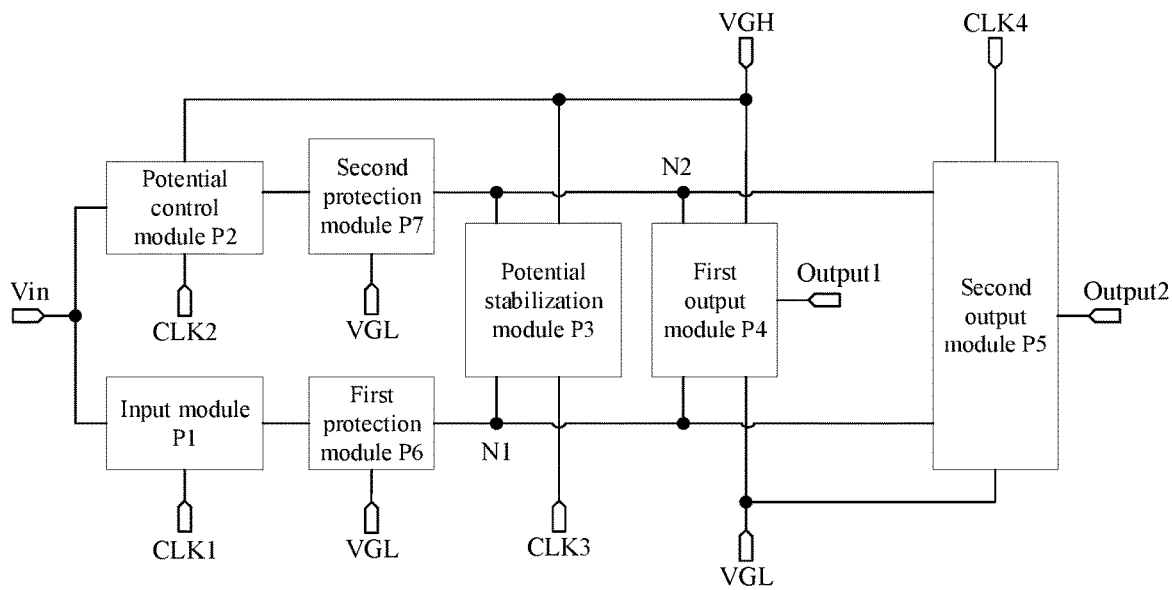
FIG. 4 illustrates another exemplary scanning signal circuit according to an embodiment of the present disclosure.

FIG. 4 is a schematic structural diagram of another exemplary scanning signal circuit consistent with various disclosed embodiments of the present disclosure. As shown in FIG. 4, the scanning signal circuit may further include a first protection module P6 and/or a second protection module P7.

The first protection module P6 may be configured to receive a low-level signal to prevent the signal with a voltage lower than the voltage of the low-level signal from being transmitted to the input module P1. The input module P1 may be electrically connected to the potential stabilization module P3, the first output module P4, and the second output module P5 through the first protection module P6.

The condition that the first protection module P6 is turned on may be that the voltage at the node N1 is higher than the voltage of the low-level signal. The node N1 may be an input position of the first output module P4 and an input position of the second output module P5. Therefore, when the voltage at the node N1 is lower than the voltage of the low-level signal, the first protection module P6 may not be turned on, and the signal whose voltage at the node N1 is lower than the voltage of the low-level signal may not be transmitted to the input module P1. Therefore, the adverse effect on the bias state of the device in the input module P1 caused by the excessively low voltage may be avoided, and the stability of the input module P1 may be improved. Accordingly, the stability of the scanning signal circuit may be improved.

The second protection module P7 may be configured to receive a low-level signal to prevent the signal with a voltage lower than the voltage of the low-level signal from being transmitted to the potential control module P2. The potential control module P2 may be electrically connected to the potential stabilization module P3, the first output module P4, and the second output module P5 through the second protection module P7.

The condition that the second protection module P7 is turned on may be that the voltage at the node N2 is higher than the voltage of the low-level signal. The node N2 may be another input location of the first output module P4 and another input location of the second output module P5. Therefore, when the voltage at the node N2 is lower than the voltage of the low-level signal, the second protection module P7 may not be turned on, and signals whose voltage at the node N2 is lower than the voltage of the low-level signal may not be transmitted to the potential control module P2. Accordingly, an adverse effect on the bias state of the device in the potential control module P2 caused by the excessively low voltage may be avoided, and the stability of the potential control module P2 may be improved, and the stability of the scanning signal circuit may be improved accordingly.

The above-mentioned first protection module P6 and the second protection module P7 may be provided independently of each other in the scanning signal circuit, which is not limited in the present disclosure. For example, the first protection module P6 may be provided in the scanning signal circuit, and the second protection module P7 may not be provided. In another embodiment, the second protection module P7 may be provided in the scanning signal circuit, but the first protection module P6 may not be provided. In another embodiment, a first protection module P6 and a second protection module P7 may both be provided in the scanning signal circuit.

The following uses an example to illustrate the specific structures of the first protection module P6 and the second protection module P7. FIG. 5 is a schematic diagram of a specific structure of the scanning signal circuit shown in FIG. 4. The structures of the input module P1, the potential control module P2, the potential stabilization module P3, the first output module P4, and the second output module P5 shown in FIG. 5 may be same as the input module P1, the potential control module P2, the potential stabilization module P3, the first output module P4, and the second output module P5 in FIG. 2, and will not be repeated. As shown in FIG. 5, the first protection module P6 may include a tenth transistor T10, and the second protection module P7 may include an eleventh transistor T11.

The control terminal of the tenth transistor T10 may be configured to receive a low-level signal. The first terminal of the tenth transistor T10 may be electrically connected to the input module P1. The second terminal of the tenth transistor T10 may be electrically connected to the potential stabilization module P3, the first output module P4, and the second output module P5. For example, the control terminal of the tenth transistor T10 may be electrically connected to the low-level signal terminal VGL. The first terminal of the tenth transistor T10 may be electrically connected to the second terminal of the first transistor T1 in the input module P1. The second terminal of the tenth transistor T10 may be electrically connected with the first terminal of the second capacitor C2 in the potential stabilization module P3, the first terminal of the fourth transistor T4, the control terminal of the fifth transistor T5, the control terminal of the seventh transistor T7 in the first output module P4 and the control terminal of the ninth transistor T9 in the second output module P5.

For example, the tenth transistor T10 may be a P-type transistor, the control terminal of the tenth transistor T10 may receive a low-level signal. Under the condition that the voltage at the second terminal of the tenth transistor T10 is higher than the voltage at the control terminal of the tenth transistor T10, i.e., the low-level signal, the tenth transistor T10 may be turned on for a conduction. When the voltage of the second terminal of the tenth transistor T10 is lower than the voltage of the control terminal of the tenth transistor T10, i.e., the voltage of the low-level signal, the tenth transistor T10 may be turned off for a disconnection. Therefore, when the voltage of the second terminal of the tenth transistor T10 is lower than the low-level signal, the signal with too low voltage at the node N1 may not be transmitted to the first transistor T1, and the effect of the low voltage may not affect the biasing stage of the first transistor T1. Accordingly, the stability of the first transistor T1 may be improved, and the stability of the scanning signal circuit may be improved.

The control terminal of the eleventh transistor T11 may be configured to receive a low-level signal. The first terminal of the eleventh transistor T11 may be electrically connected to the potential control module P2. The second terminal of the eleventh transistor T11 may be electrically connected to the potential stabilization module P3, the first output module P4, and the second output module P5. For example, the control terminal of the eleventh transistor T11 may be electrically connected to the low-level signal terminal VGL. The first terminal of the eleventh transistor T11 may be electrically connected to the first terminal of the third transistor T3 in the potential control module P2. The second terminal of the eleventh transistor T11 may be electrically connected to the control terminal of the fourth transistor T4 in the potential stabilization module P3, the first terminal of the fifth transistor T5, the control terminal of the sixth transistor T6 in the first output module P4, the control terminal of the eighth transistor T8 in the second output module P5, and the first terminal of the third capacitor C3.

For example, the eleventh transistor T11 may be a P-type transistor, the control terminal of the eleventh transistor T11 may receive a low-level signal. When the voltage at the second terminal of the eleventh transistor T11 may be higher than the voltage at the control terminal of the eleventh transistor T11, i.e., the low-level signal, the eleventh transistor T11 may be turned on for a conduction. When the voltage of the second terminal of the eleventh transistor T11 is lower than the voltage of the control terminal of the eleventh transistor T11, i.e., the voltage of the low-level signal, the eleventh transistor T11 may be turned off for a disconnection. Therefore, when the voltage of the second terminal of the eleventh transistor T11 is lower than the low-level signal, the signal with too low voltage at the node N2 may not be transmitted to the third transistor T3. Thus, the adverse effect to the bias state of the third transistor T3 may be avoided, the stability of the third transistor T3 may be improved, and the stability of the scanning signal circuit may be accordingly improved.

The present disclosure also provides a driving method of a scanning signal circuit. FIG. 6 illustrates a flowchart of an exemplary driving method of a scanning signal circuit consistent with various disclosed embodiments of the present disclosure. As shown in FIG. 6, the driving method of the scanning signal circuit may include steps S601 to S604.

In the step S601, under the action of the input signal, the first target clock signal, the second target clock signal, and the third target clock signal, the input module and the potential control module may transmit the input signal and the second target clock signal to the potential stabilization module, the first output module and the second output module.

In the step S602, the potential stabilization module may use the high-level signal and the third target clock signal to stabilize the input of the first output module and the input of the second output module.

In step S603, the first output module may output a first output signal. The first output signal may be used as the input signal of the next-stage scanning signal circuit.

In step S604, the second output module may use the fourth target clock signal to output a second output signal with a high-level pulse. The second output signal may be used as a scanning signal of the pixel driving circuit.

The specific content of the step S601 to the step S604 may be referred to the related description in the above-mentioned embodiments.

In the embodiment of the present disclosure, under the action of the input signal, the first target clock signal, the second target clock signal, and the third target clock signal, the input module and the potential control module in the scanning signal circuit may transmit the input signal and the second target clock signal to the potential stabilization module, the first output module and the second output module. The first output module may output the first output signal as the input signal of the next-stage scanning signal circuit under the stabilization effect of the potential stabilization module and the high-level signal and the low-level signal. The second output module may output the second output signal with the high-level pulses as the scanning signal of the pixel drive circuit under the stabilization of the potential stabilization module and the fourth target clock signal and the low-level signal to realize providing a scanning signals with high-level pulses.

The operation of the devices in the scanning signal circuit in the foregoing embodiment may be referred to the relevant description in the foregoing embodiments.

Figure 7:
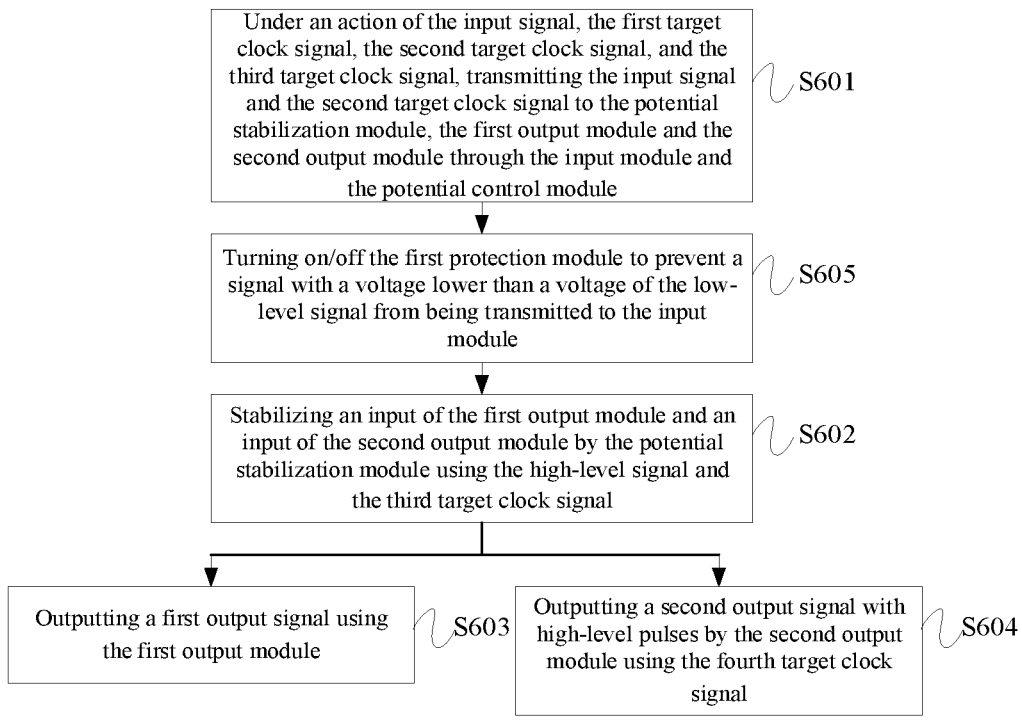
FIG. 7 illustrates another flow chart of an exemplary driving method of a scanning signal circuit according to an embodiment of the present disclosure.

In some embodiments, the scanning signal circuit may further include a first protection module, which may prevent a signal with an excessively low voltage from causing adverse effects on the input module. FIG. 7 is a flowchart of another exemplary method for driving a scanning signal circuit consistent with various disclosed embodiments of the present disclosure. The difference between FIG. 7 and FIG. 6 may be that the driving method of the scanning signal circuit shown in FIG. 7 may further include a step S605.

In the step S605, the first protection module may be turned on or off to prevent the signal whose voltage is lower than the voltage of the low-level signal from being transmitted to the input module.

It should be noted that when the first protection module is turned on, a signal with a voltage higher than the voltage of the high-level signal may be transmitted to the input module. The first protection module may be turned on and off by the voltage of the signal on the line connecting the first protection module and the potential stabilization module, the first output module, and the second output module.

The specific content of the first protection module may be referred to the related description in the above-mentioned embodiment, which will not be repeated here. The time sequence relationship between step S605 and other steps is also not limited here.

Figure 8:
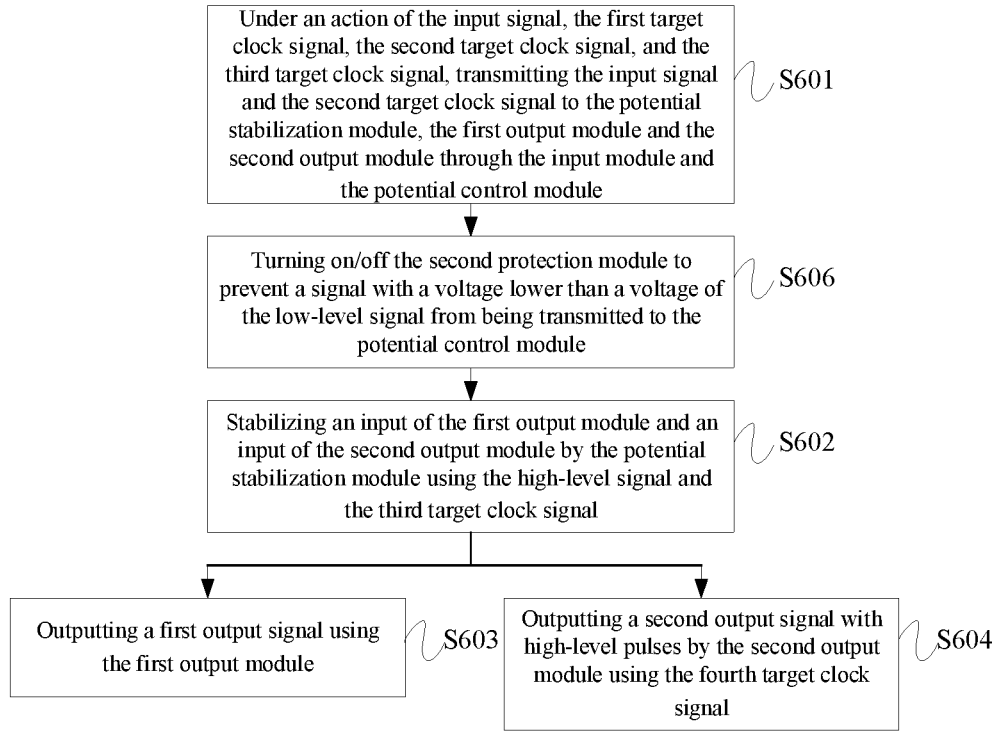
FIG. 8 illustrates another flow chart of an exemplary driving method of a scanning signal circuit according to an embodiment of the present disclosure.

In some embodiments, the scanning signal circuit may further include a second protection module, which may prevent a signal with an excessively low voltage from causing adverse effects on the potential control module. FIG. 8 is a flowchart of another exemplary method for driving a scanning signal circuit consistent with various disclosed embodiments of the present disclosure. The difference between FIG. 8 and FIG. 6 may be that the driving method of the scanning signal circuit shown in FIG. 8 may further include a step S606.

In the step S606, the second protection module may be turned on or off to prevent signals whose voltage is lower than the voltage of the low-level signal from being transmitted to the potential control module.

It should be noted that when the second protection module is turned on, a signal with a voltage higher than the voltage of the high-level signal may be transmitted to the potential control module. The turn-on and turn-off of the second protection module may be realized by the voltage of the signal on the line connecting the second protection module and the potential stabilization module, the first output module, and the second output module.

The specific content of the second protection module may be referred to the relevant description in the above-mentioned embodiments, which will not be repeated here. The time sequence relationship between the step S606 and other steps is also not limited here.

In the above embodiment, the first target clock signal and the third target clock signal may both be signals with low-level pulses. There is a shift in the time sequence between the low-level pulses in the first target clock signal and the low-level pulses in the third target clock signal. The second target clock signal may be a signal with high-level pulses. There is a shift in the time sequence between the high-level pulses in the second target clock signal and the high-level pulses in the fourth target clock signal.

Figure 9:
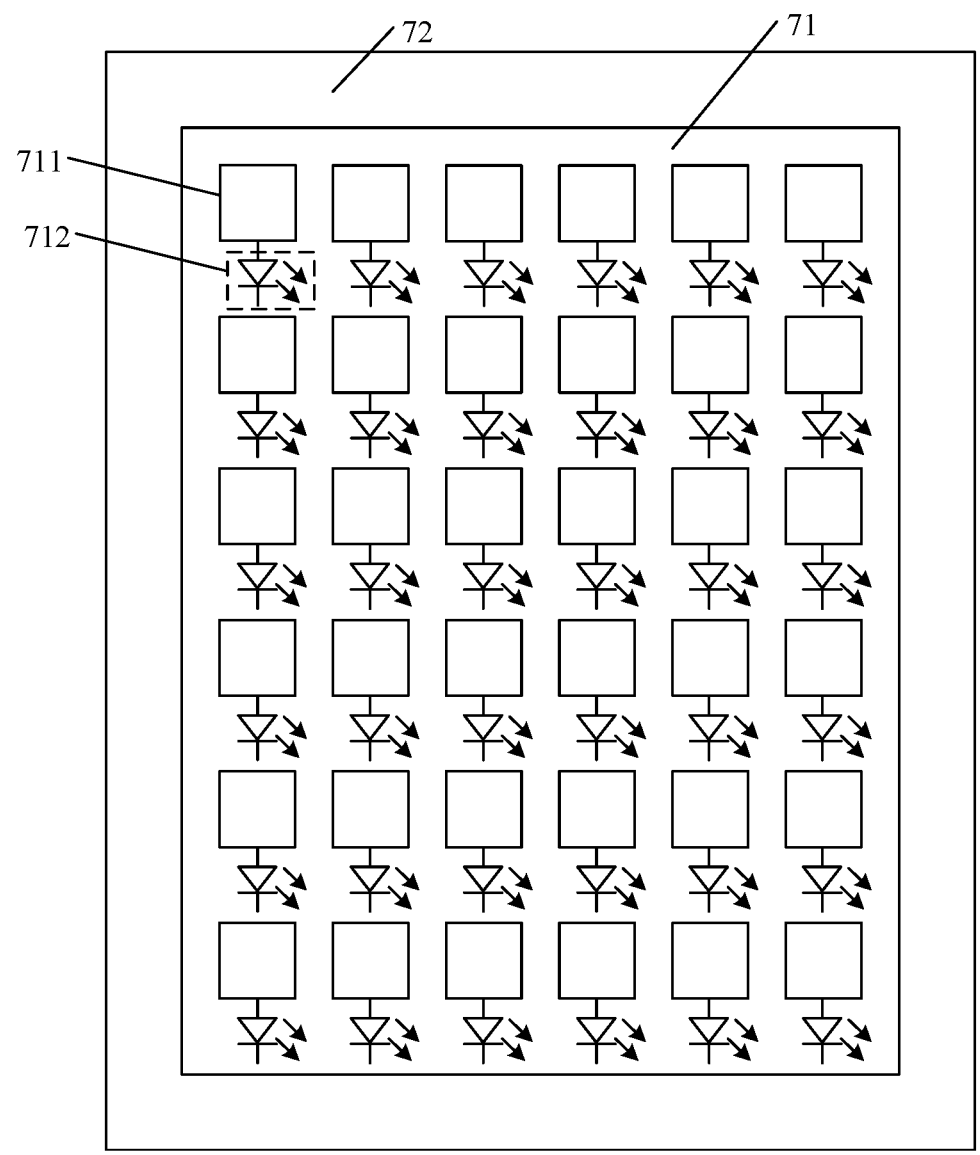
FIG. 9 illustrates an exemplary display panel according to an embodiment of the present disclosure.

The present disclosure also provides a display panel. FIG. 9 is a schematic structural diagram of an exemplary display panel consistent with various disclosed embodiments of the present disclosure.

As shown in FIG. 9, the display panel may include a display area 71 and a non-display area 72. The display area 71 may include multiple rows of pixel driving circuits 711. The pixel driving circuit 711 may drive the light-emitting element 712.

The pixel driving circuit 711 may include an N-type transistor. The circuit structure of the pixel driving circuit 111 may be a 2T1C circuit, a 7T1C circuit, a 7T2C circuit, or a 9T1C circuit, etc. The circuit structure of the pixel driving circuit is not limited in the present disclosure. In the present disclosure, "2T1C circuit" may refer to a pixel circuit that includes 2 thin-film transistors (T) and 1 capacitor (C). The "7T1C circuit", "7T2C circuit", and "9T1C circuit", etc., may be analogized in this order.

Figure 10:
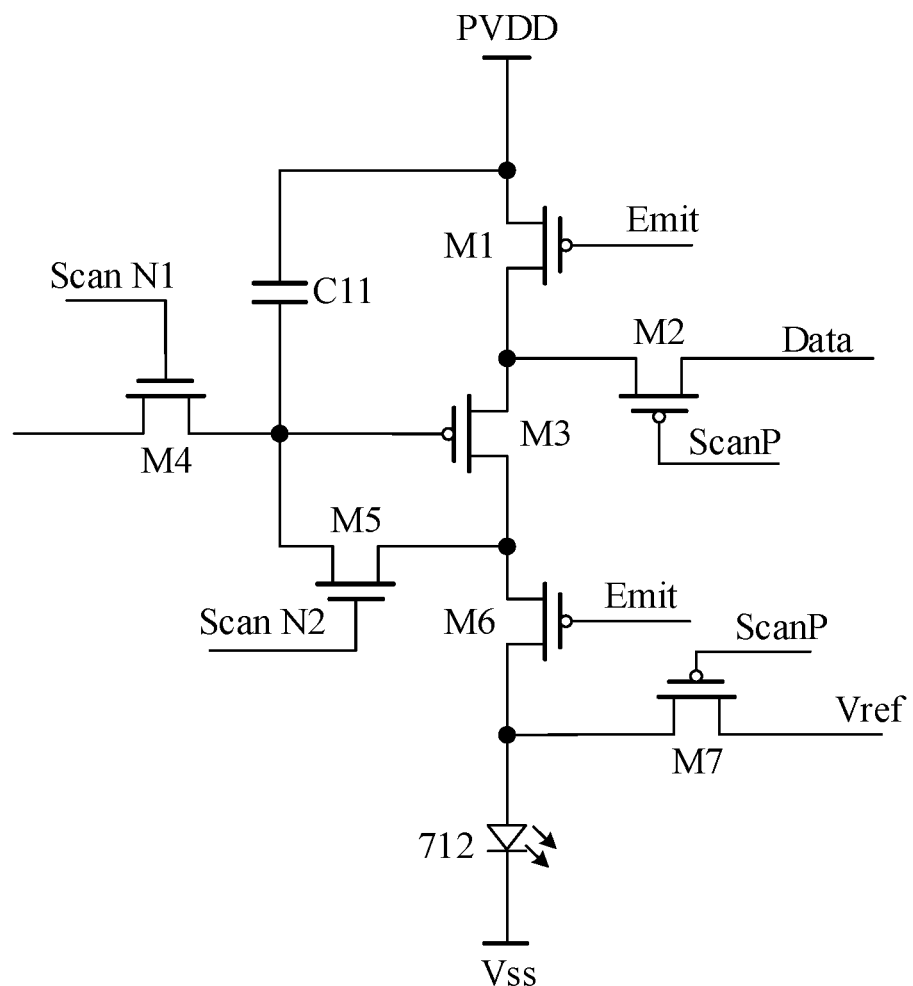
FIG. 10 illustrates an exemplary pixel driving circuit according to an embodiment of the present disclosure.

For example, FIG. 10 is a schematic structural diagram of an exemplary pixel driving circuit consistent with various disclosed embodiment of the present disclosure. As shown in FIG. 10, the pixel driving circuit may be a 7T1C circuit for driving the light-emitting element 712. The pixel driving circuit may include transistors M1 to M7 and a capacitor C11. Among them, the transistors M4 and M5 may be N-type transistors. The control terminal of the transistor M4 and the control terminal of the transistor M5 may need to receive a scanning signal with high-level pulses. The pixel driving circuit may be connected to the scanning signal terminal ScanN1, the scanning signal terminal ScanN2, the scan signal terminal ScanP, the power signal terminal PVDD, the light-emission control signal terminal Emit, the data signal terminal Data, the common ground signal terminal Vss, and the reference signal terminal Vref, etc. In one embodiment, the scanning signal terminal ScanN1 and/or the scanning signal terminal ScanN2 may be connected to the output terminal Output2 of the scanning signal circuit, and the scanning signal with high-level pulses may be provided to the pixel driving circuit through the scanning signal terminal ScanN1 and/or the scanning signal terminal ScanN2.

Corresponding to the N-type transistor in the pixel driving circuit, the non-display area 72 may include the scanning signal circuit in the above-mentioned embodiment provided corresponding to each row of the pixel driving circuit 711.

The i-th row pixel driving circuits may be electrically connected to the output terminals of the second output module in the corresponding scanning signal circuit, and i may be a positive integer. For example, the i-th row pixel driving circuits may obtain the second output signal from the scanning signal circuit as the scanning signal required by the i-th row pixel driving circuit.

Figure 11:
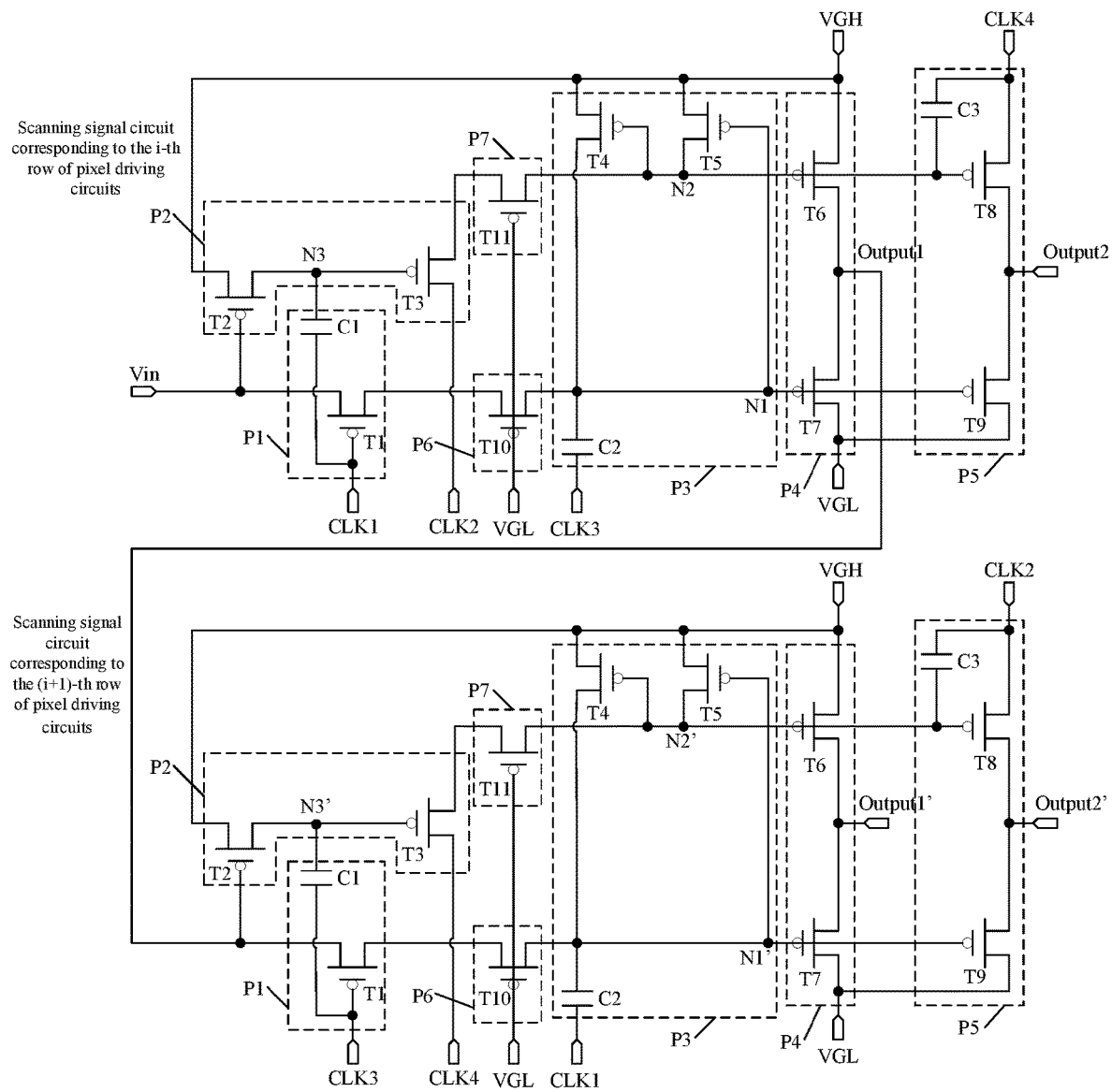
FIG. 11 illustrates a connection relationship of the scanning signal circuits corresponding two adjacent pixel driving circuits according to an embodiment of the present disclosure.

FIG. 11 is a schematic diagram of an exemplary connection relationship of scan signal circuits corresponding to two adjacent rows of pixel driving circuits consistent with various disclosed embodiments of the present disclosure. As shown in FIG. 11, the output terminal of the first output module in the scanning signal circuit corresponding to an i-th row of pixel driving circuits may be electrically connected to the input terminal of the input module in the scanning signal circuit corresponding to the (i+1)-th row of pixel driving circuits. Through the cascade connection of the scanning signal circuits corresponding to the pixel driving circuits of multiple rows, the shift of the high-level pulses in the second output signals output by the scanning signals corresponding to the pixel driving circuits of different rows may be realized. Accordingly, the control of the scanning signals to multiple rows of pixel driving circuits in the display panel may be achieved.

In the embodiment of the present disclosure, the scanning signal circuit in the display panel may generate a scanning signal with high-level pulses to meet the requirements of a pixel driving circuit including an N-type transistor in the display panel and realize the normal display of the display panel. Further, the first output signal output by the scanning signal circuit corresponding to the i-th row of pixel driving circuits may be used as the input signal output by the scanning signal circuit corresponding to the (i+1)-th row of pixel driving circuits, it may not need to dispose an input signal generation device for the scanning signal corresponding to each row of pixel driving circuits, the structure of the display panel may be simplified.

In some embodiments, the first target clock signal received by the scanning signal circuit corresponding to one row of pixel driving circuits may be one of the first clock signal and the second clock signal; and the third target clock received by the scanning signal circuit corresponding to one row of pixel driving circuits may be the other of the first clock signal and the second clock signal. The second target clock signal received by the scanning signal circuit corresponding to one row of pixel driving circuits may be one of the third clock signal and the fourth clock signal; and the fourth target clock signal received by the scanning signal circuit corresponding to one row of pixel driving circuits may be the other of the third clock signal and the fourth clock signal.

The first target clock signal received by the scanning signal circuit corresponding to the i-th row of the pixel driving circuits may be same as the third target clock signal received by the scanning signal circuit corresponding to the (i+1)-th row of the pixel driving circuits. The second target clock signal received by the scanning signal circuit corresponding to the i-th row of pixel driving circuits may be same as the fourth target clock signal received by the scanning signal circuit corresponding to the (i+1)-th row of pixel driving circuits.

Both the first clock signal and the second clock signal may have low-level pulses. The low-level pulses of the first clock signal and the low-level pulses of the second clock signal may be shifted in the time sequence. The third clock signal and the fourth clock signal may be both signals with high-level pulses. The high-level pulses of the third clock signal and the high-level pulses of the fourth clock signal may be shifted in the time sequence.

For example, the first clock signal terminal CLK1 may provide the first clock signal, the second clock signal terminal CLK2 may provide the second clock signal, the third clock signal terminal CLK3 may provide the third clock signal, and the fourth clock signal terminal CLK4 may provide the fourth clock signal. As shown in FIG. 11, in the scanning signal circuit corresponding to the i-th row of the pixel driving circuits, the input module may be electrically connected to the first clock signal terminal CLK1, the potential control module may be electrically connected to the second clock signal terminal CLK2, the potential stabilization module may be electrically connected to the third clock signal terminal CLK3, and the second output module may be electrically connected to the fourth clock signal terminal CLK4. In the scanning signal circuit corresponding to the (i+1)-th row of pixel driving circuits, the input module may be electrically connected to the third clock signal terminal CLK3, the potential control module may be electrically connected to the fourth clock signal terminal CLK4, the potential stabilization module may be electrically connected to the first clock signal terminal. CLK1, and the second output module may be electrically connected to the second clock signal terminal CLK2.

By adjusting the first target clock signal, the second target clock signal, the third target clock signal, and the fourth target clock signal of the scanning signal circuit corresponding to the i-th row of pixel driving circuits and the first target clock signal, the second target clock signal, the third target clock signal, and the fourth target clock signal of the scanning signal circuit corresponding to the (i+1)-th row of pixel driving circuits, the shift of the high-level pulses in the second output signal of the scanning signal circuit corresponding to the i-th row of pixel driving circuits with respect to the high-level pulses in the second output signal of the scanning signal circuit corresponding to the (i+1)-th row of pixel driving circuits may be achieved.

Figure 12:
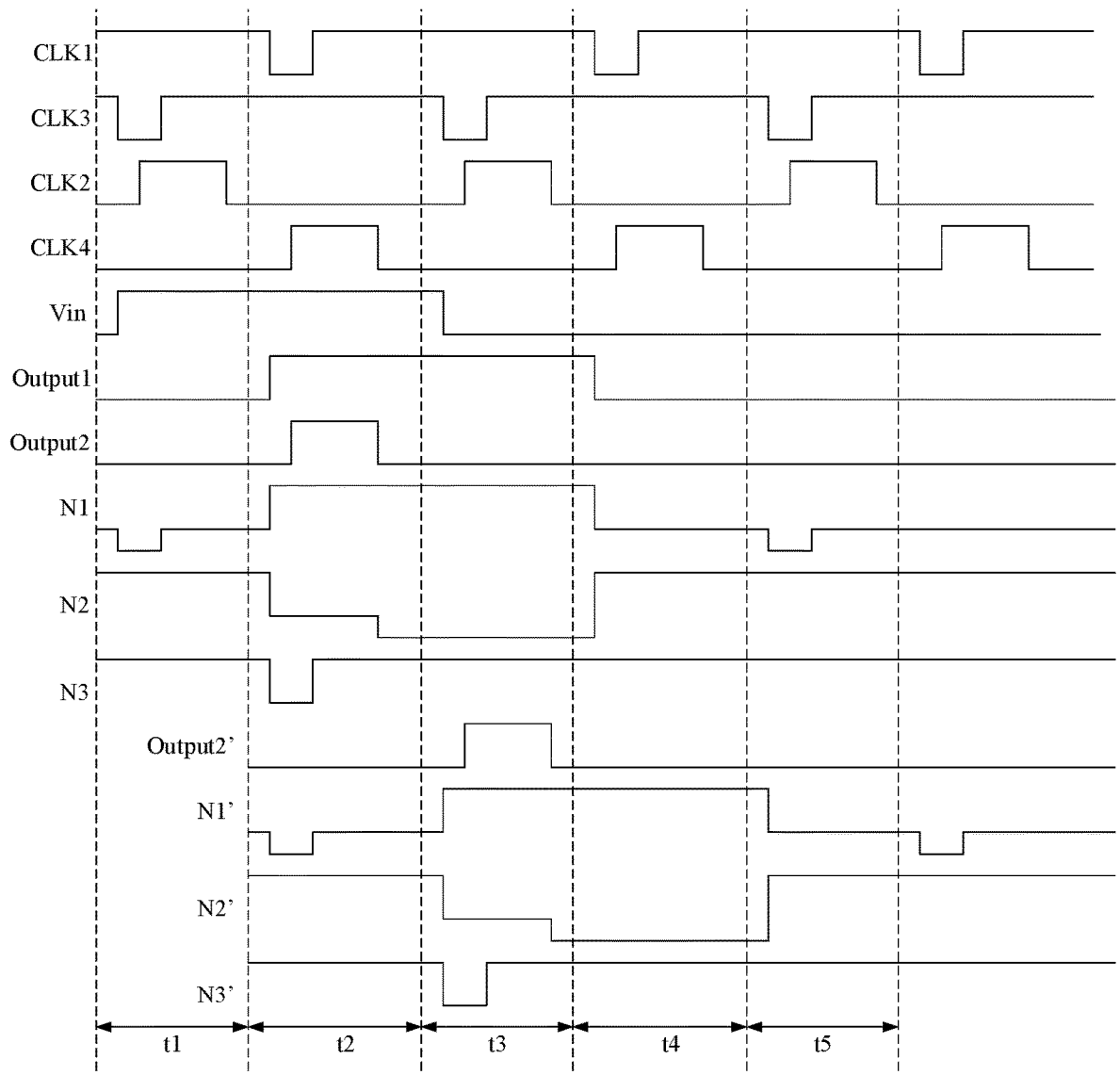
FIG. 12 illustrates a sequence diagram of the scanning signal circuits corresponding two adjacent pixel driving circuits according to an embodiment of the present disclosure.

Corresponding to FIG. 11, FIG. 12 is a signal sequence diagram of a scanning signal circuit corresponding to two adjacent rows of pixel driving circuits consistent with various disclosed embodiments. The difference between FIG. 12 and FIG. 3 may be that the signal time sequence at the nodes N1', N2', and N3' in the scanning signal circuit corresponding to the (i+1)-th row of pixel driving circuits and the time sequence of the second output signal output by the output terminal Output2' of the second output module of the scanning signal circuit corresponding to the (i+1)-th row of the pixel driving circuit may be included. The signal waveform at the node N1' in the scanning signal circuit corresponding to the pixel driving circuit in the (i+1)-th row of pixel driving circuits may be shifted in the time sequence relative to the signal waveform at the node N1 in the scanning signal circuit corresponding to the i-th row of pixel driving circuits. The signal waveform at the node N2' in the scanning signal circuit corresponding to the (i+1)-th row of pixel driving circuits may be shifted in the time sequence relative to the signal waveform at the node N2 in the scanning signal circuit corresponding to the i-th row of pixel driving circuits. The signal waveform at the node N3' in the scanning signal circuit corresponding to the (i+1)-th row of pixel driving circuit may be shifted in the time sequence relative to the signal waveform at the node N3 in the scanning signal circuit corresponding to the i-th row of pixel driving circuits. The high-level pulses of the second output signal output by the scanning signal circuit corresponding to the (i+1)-th row of pixel driving circuits may be shifted in the time sequence relative to the high-level pulses of the second output signal output by the scanning signal circuit corresponding to the i-th row of pixel driving circuits.

The working principle of the scanning signal circuit corresponding to the (i+1)-th row of pixel driving circuit may be same as the working principle of the scanning signal circuit corresponding to the i-th row of the pixel driving circuit.

In some embodiments, the pixel driving circuit may further include a P-type transistor. The non-display area may also include a low-level pulse scanning signal circuit corresponding to each row of pixel driving circuits. The low-level pulse scanning signal circuit may provide a scan signal with low-level pulses for the pixel driving circuit, and the structure of the low-level pulse scanning signal circuit may not be limited. As shown in FIG. 10, the transistors M1, M2, M3, M6, and M7 may be P-type transistors. The control terminal of the transistor M7 may need to receive a scanning signal with low-level pulses. For example, the scanning signal ScanP may be the scanning signal output by the low-level pulse scan signal circuit.

The present disclosure also provides a display device. The display device may include a display panel in the above embodiments, or other appropriate display panel. The display device may specifically be a device with a display function, such as a mobile phone, a computer, a tablet computer, a TV, or an electronic paper, etc.

Thus, the present disclosure provides a scanning signal circuit, a display panel, a display device, and a driving method. Under the action of the input signal, the first target clock signal, the second target clock signal and the third target clock signal, the input module and the potential control module in the scanning signal circuit may transmit the input signal and the second target clock signal to the potential stabilization module, the first output module and the second output module. The first output module may output the first output signal as the input signal of the next-stage scanning signal circuit under the stabilization effect of the potential stabilization module and the high-level signal and the low-level signal. The second output module may output the second output signal with the high-level pulses as the scanning signal of the pixel driving circuit under the stabilization of the potential stabilization module and the fourth target clock signal and the low-level signal. Thus, the scanning signals with high-level pulses may be provided.

It should be clarified that the same or similar parts between the various embodiments may be referred to each other, and each embodiment may focus on the differences from other embodiments. Regarding the embodiments of the driving method of the scanning signal circuit, the embodiments of the display panel, and the embodiments of the display device, the relevant parts may be referred to the description part of the embodiments of the scanning signal circuits. The present disclosure is not limited to the specific steps and structures described above and shown in the figures. Those skilled in the art can make various changes, modifications, and additions, or change the order between steps after grasping the spirit of the disclosure. For the sake of brevity, a detailed description of the known method and technology is omitted here.

Those skilled in the art should understand that the above-mentioned embodiments are all exemplary rather than restrictive. Different technical features appearing in different embodiments may be combined to achieve beneficial effects. Those skilled in the art should be able to understand and implement other modified embodiments of the disclosed embodiments on the basis of studying the drawings, the description, and the claims. In the claims, the term "comprising" does not exclude other means or steps; the indefinite article "a" does not exclude multiple; and the terms "first" and "second" are used to indicate names rather than to indicate any specific order of. Any reference signs in the claims should not be construed as limiting the scope of protection. The functions of multiple parts appearing in the claims may be implemented by a single hardware or software module. The appearance of certain technical features in different dependent claims does not mean that these technical features cannot be combined to achieve beneficial effects.

What is claimed is:

1. A scanning signal circuit, comprising:
    an input module, a potential control module, a potential stabilization module, a first output module and a second output module,
    wherein:

the input module is configured to receive an input signal and a first target clock signal, and is electrically connected to the potential control module, the potential stabilization module, the first output module, and the second output module;

the potential control module is configured to receive a high-level signal and a second target clock signal, and is electrically connected to the potential stabilization module, the first output module, and the second output module;

the potential stabilization module is configured to receive the high-level signal and a third target clock signal, and is electrically connected to the first output module and the second output module;

the first output module is configured to receive the high-level signal and a low-level signal;

the second output module is configured to receive a fourth target clock signal and the low-level signal;

the fourth target clock signal is a signal with high-level pulses;

under an action of the input signal, the first target clock signal, the second target clock signal and the third target clock signal, the input signal and the second target clock signal are transmitted to the potential stabilization module, the first output module and the second output module through the input module and the potential control module;

under a stabilization function of the potential stabilization module, using the high-level signal and the third target clock signal, on an input of the first output module and an input of the second output module, the first output module is configured to output a first output signal, and the second output module is configured to use the fourth target clock signal to output a second output signal with high-level pulses;

the first output signal is used as an input signal of a next-stage scanning signal circuit; and the second output signal is used as a scanning signal of a pixel driving circuit.

2. The scanning signal circuit according to claim 1, wherein the input module comprises:
a first transistor; and
a first capacitor,
wherein:
a control terminal of the first transistor is configured to receive the first target clock signal and is electrically connected with a first terminal of the first capacitor, a first terminal of the first transistor is configured to receive the input signal and is electrically connected with the potential control module, a second terminal of the first transistor is electrically connected to the potential stabilization module, the first output module and the second output module; and
the first terminal of the first capacitor is configured to receive the first target clock signal, and a second terminal of the first capacitor is electrically connected to the potential control module.

3. The scanning signal circuit according to claim 1, wherein the potential control module comprises:
a second transistor; and
a third transistor,
wherein:
a control terminal of the second transistor is configured to receive the input signal and is electrically connected to the input module, a first terminal of the second transistor is configured to receive the high-level signal and is electrically connected to the potential stabilization module and the first output terminal, and a second terminal of the second transistor is electrically connected with the input module and a control terminal of the third transistor; and the control terminal of the third transistor is electrically connected to the input module, a first terminal of the third transistor is electrically connected to the potential stabilization module, the first output module and the second output module, and a second terminal of the third transistor is configured to receive the second target clock signal.

4. The scanning signal circuit according to claim 1, wherein the potential stabilization module comprises:
a fourth transistor;
a fifth transistor; and
a second capacitor,
wherein:
a control terminal of the fourth transistor is electrically connected to the potential control module, the first output module, the second output module and a first terminal of the fifth transistor, a first terminal of the fourth transistor is electrically connected to a first terminal of the second capacitor, a control terminal of the fifth transistor, the input module, the first output module and the second output module, and a second terminal of the fourth transistor is configured to receive the high-level signal and is electrically connected to the potential control module and a second terminal of the fifth transistor;
the control terminal of the fifth transistor is electrically connected to the first terminal of the second capacitor, the input module, the first output module and the second output module, the first terminal of the fifth transistor is electrically connected to the potential control module, the first output module and the second output module, and the second terminal of the fifth transistors is configured to receive the high-level signal and is electrically connected with the potential control module; and
a second terminal of the second capacitor is configured to receive the third target clock signal.

5. The scanning signal circuit according to claim 1, wherein the first output module comprises:
a sixth transistor; and
a seventh transistor,
wherein:
a control terminal of the sixth transistor is electrically connected to the potential stabilization module and the potential control module, a first terminal of the sixth transistor is configured to receive the high-level signal and is electrically connected with the potential control module and the potential stabilization module, and a second terminal of the sixth transistor is electrically connected with a first terminal of the seventh transistor and an output terminal of the first output module; and
a control terminal of the seventh transistor is electrically connected to the potential stabilization module and the input module, the first terminal of the seventh transistor is electrically connected to the output terminal of the first output module, and a second terminal of the seventh transistor is configured to receive the low-level signal.

6. The scanning signal circuit according to claim 1, wherein the second output module comprises:
an eighth transistor;
a ninth transistor; and
a third capacitor, wherein:
a control terminal of the eighth transistor is electrically connected with a first terminal of the third capacitor, the potential control module and the potential stabilization module, a first terminal of the eighth transistor is configured to receive the fourth target clock signal and is electrically connected with a second terminal of the third capacitor, and a second terminal of the eighth transistor is electrically connected to a first terminal of the ninth transistor and an output terminal of the second output module;

a control terminal of the ninth transistor is electrically connected with the input terminal and the potential stabilization module, the first terminal of the ninth transistor is electrically connected with an output terminal of the second output module, and a second terminal of the ninth transistor is configured to receive the low-level signal; and the second terminal of the third capacitor is configured to receive the fourth target clock signal.

7. The scanning signal circuit according to claim 1, further comprising:
a first protection module,
wherein:
the first protection module is configured to receive the low-level signal to prevent a signal with a voltage lower than a voltage of the low-level signal from being transmitted to the input module; and
the input module is electrically connected to the potential stabilization module, the first output module and the second output module through the first protection module.

8. The scanning signal circuit according to claim 7, wherein the first protection module comprises:
a tenth transistor,
wherein a control terminal of the tenth transistor is configured to receive the low-level signal, a first terminal of the tenth transistor is electrically connected to the input module, and a second terminal of the tenth transistor is electrically connected to the potential stabilization module, the first output module and the second output module.

9. The scanning signal module according to claim 1, further comprising:
a second protection module,
wherein:
the second protection module is configured to receive the low-level signal to prevent a signal with a voltage lower than a voltage of the low-level signal from being transmitted to the potential control module; and
the potential control module is electrically connected to the potential stabilization module, the first output module and the second output module through the second protection module.

10. The scanning signal circuit according to claim 9, wherein the second protection module comprises:
an eleventh transistor;
wherein a control terminal of the eleventh transistor is configured to receive the low-level signal, a first terminal of the eleventh transistor is electrically connected to the potential control module, and a second terminal of the eleventh transistor is electrically connected to the potential stabilization module, the first output module and the second output module.

11. The scanning signal module according to claim 1, wherein:

the first target clock signal and the third target clock signal are both signals with low-level pulses;
the low-level pulses in the first target clock signal are shifted in a time sequence relative to the low-level pulses in the third target clock signal;
the second target clock signal is a signal with high-level pulses; and
the high-level pulses in the second target clock signal are shifted in a time sequence relative to high-level pulses in the fourth target clock signal.

12. A display panel, comprising:
a display area; and
a non-display area,
wherein:
the display area includes multiple rows of pixel driving circuits;
the multiple rows of pixel driving circuits include N-type transistors;
the non-display area includes a scanning signal circuit disposed corresponding to each row of pixel driving circuits of the multiple rows of pixel driving circuits, wherein the scanning signal circuit includes:
an input module, a potential control module, a potential stabilization module, a first output module and a second output module,
wherein:
the input module is configured to receive an input signal and a first target clock signal, and is electrically connected to the potential control module, the potential stabilization module, the first output module, and the second output module;
the potential control module is configured to receive a high-level signal and a second target clock signal, and is electrically connected to the potential stabilization module, the first output module, and the second output module;
the potential stabilization module is configured to receive the high-level signal and a third target clock signal, and is electrically connected to the first output module and the second output module;
the first output module is configured to receive the high-level signal and a low-level signal;
the second output module is configured to receive a fourth target clock signal and the low-level signal;
the fourth target clock signal is a signal with high-level pulses;
under an action of the input signal, the first target clock signal, the second target clock signal, and the third target clock signal, the input signal and the second target clock signal are transmitted to the potential stabilization module, the first output module and the second output module through the input module and the potential control module;
under a stabilization function of the potential stabilization module, using the high-level signal and the third target clock signal, on an input of the first output module and an input of the second output module, the first output module is configured to output a first output signal, and the second output module is configured to use the fourth target clock signal to output a second output signal with high-level pulses;
the first output signal is used as an input signal of a next-stage scanning signal circuit; and
the second output signal is used as a scanning signal of a pixel driving circuit;

an i-th row of pixel driving circuits of the multiple rows of pixel driving circuits is electrically connected to an output terminal of the second output module of the scanning signal circuit corresponding to the i-th row of pixel driving circuits, i being a positive integer; and an output terminal of the first output module of the scanning signal circuit corresponding to the i-th row of pixel driving circuits of the multiple rows of pixel driving circuits is electrically connected with an input terminal of the input module of the scanning signal circuit corresponding to an (i+1)-th row of pixel driving circuits of the multiple rows of pixel driving circuits.

13. The display panel according to claim 12, wherein:

the first target clock signal received by the scanning signal circuit corresponding to one row of the multiple rows of pixel driving circuits is one of a first clock signal and a second clock signal, and the third target clock signal received by the scanning signal circuit corresponding to the one row of pixel driving circuits is another one of the first clock signal and the second clock signal;

the second target clock signal received by the scanning signal circuit corresponding to the one row of pixel driving circuits is one of a third clock signal and a fourth clock signal, and the fourth target clock signal received by the scanning signal circuit corresponding to the one row of pixel driving circuits is another one of the third clock signal and the fourth clock signal;

the first target clock signal received by the scanning signal circuit corresponding to the i-th row of pixel driving circuits is same as the third target clock signal received by the scanning signal circuit corresponding to the (i+1)-th row of pixel driving circuits; and the second target clock signal received by the scanning signal circuit corresponding to the i-th row of pixel driving circuits is same as the fourth target clock signal received by the scanning signal circuit corresponding to the (i+1)-th row of pixel driving circuits.

14. The display panel according to claim 12, the multiple rows of pixel driving circuits further comprises:

P-type transistors, wherein the non-display area also includes a low-level pulse scanning signal circuit corresponding to each row of pixel driving circuits of the multiple rows of pixel driving circuits, and the low-level pulse scanning signal circuit provides a scanning signal with low-level pulses to the row of pixel driving circuits.

15. A display device, comprising:

a display panel, including a display area; and a non-display area, wherein:

the display area includes multiple rows of pixel driving circuits;

the multiple rows of pixel driving circuits include N-type transistors;

the non-display area includes a scanning signal circuit disposed corresponding to each row of pixel driving circuits of the multiple rows of pixel driving circuits, wherein the scanning signal circuit includes:

an input module, a potential control module, a potential stabilization module, a first output module and a second output module, wherein:

the input module is configured to receive an input signal and a first target clock signal, and is electrically connected to the potential control module, the potential stabilization module, the first output module, and the second output module;

the potential control module is configured to receive a high-level signal and a second target clock signal, and is electrically connected to the potential stabilization module, the first output module, and the second output module;

the potential stabilization module is configured to receive the high-level signal and a third target clock signal, and is electrically connected to the first output module and the second output module;

the first output module is configured to receive the high-level signal and a low-level signal;

the second output module is configured to receive a fourth target clock signal and the low-level signal;

the fourth target clock signal is a signal with high-level pulses;

under an action of the input signal, the first target clock signal, the second target clock signal, and the third target clock signal, the input signal and the second target clock signal are transmitted to the potential stabilization module, the first output module and the second output module through the input module and the potential control module;

under a stabilization function of the potential stabilization module, using the high-level signal and the third target clock signal, on an input of the first output module and an input of the second output module, the first output module is configured to output a first output signal, and the second output module is configured to use the fourth target clock signal to output a second output signal with high-level pulses;

the first output signal is used as an input signal of a next-stage scanning signal circuit; and the second output signal is used as a scanning signal of a pixel driving circuit;

an i-th row of pixel driving circuits of the multiple rows of pixel driving circuits is electrically connected to an output terminal of the second output module of the scanning signal circuit corresponding to the i-th row of pixel driving circuits, i being a positive integer; and an output terminal of the first output module of the scanning signal circuit corresponding to the i-th row of pixel driving circuits of the multiple rows of pixel driving circuits is electrically connected with an input terminal of the input module of the scanning signal circuit.

16. A method for driving a scanning signal circuit, comprising:

providing a scanning signal circuit including an input module, a potential control module, a potential stabilization module, a first output module and a second output module, wherein:

the input module is configured to receive an input signal and a first target clock signal, and is electrically connected to the potential control module, the potential stabilization module, the first output module, and the second output module;

the potential control module is configured to receive a high-level signal and a second target clock signal, and is electrically connected to the potential stabilization module, the first output module, and the second output module;

the potential stabilization module is configured to receive the high-level signal and a third target clock signal, and is electrically connected to the first output module and the second output module;

the first output module is configured to receive the high-level signal and the low-level signal;

the second output module is configured to receive a fourth target clock signal and the low-level signal; and the fourth target clock signal is a signal with high-level pulses;

under an action of the input signal, the first target clock signal, the second target clock signal, and the third target clock signal, transmitting the input signal and the second target clock signal to the potential stabilization module, the first output module and the second output module through the input module and the potential control module;

stabilizing an input of the first output module and an input of the second output module by the potential stabilization module using the high-level signal and the third target clock signal;

outputting a first output signal by the first output module, wherein the first output signal is used as an input signal of a next-stage scanning signal circuit; and outputting a second output signal with high-level pulses by the second output module using the fourth target clock signal, wherein the second output signal is used as a scanning signal of a pixel driving circuit.

17. The method according to claim 16, wherein:
the scanning signal circuit also includes a first protection module;

the input module is electrically connected with the potential stabilization module, the first output module and the second output module through the first protection module; and the method also includes turning on/off the first protection module to prevent a signal with a voltage lower than a voltage of the low-level signal from being transmitted to the input module.

18. The method according to claim 16, wherein:
the scanning signal circuit also includes a second protection module;

the potential control module is electrically connected with the potential stabilization module, the first output module and the second output module through the second protection module; and the method also includes turning on/off the second protection module to prevent a signal with a voltage lower than a voltage of the low-level signal from being transmitted to the potential control module.

19. The method according to claim 16, wherein:
the first target clock signal and the third target clock signal are both signals with low-level pulses;

the low-level pulses in the first target clock signal are shifted in a time sequence relative to the low-level pulses in the third target clock signal;

the second target clock signal is a signal with high-level pulses; and the high-level pulses in the second target clock signal are shifted in a time sequence relative to high-level pulses of the fourth target clock signal.

* * * * *